(12) United States Patent
Treadway

(10) Patent No.: US 11,198,795 B2
(45) Date of Patent: Dec. 14, 2021

(54) GLYCIDYL ETHER BASED OPTICAL COATING COMPOSITIONS

(71) Applicant: The Walman Optical Company, Minneapolis, MN (US)

(72) Inventor: Gerald D. Treadway, Penngrove, CA (US)

(73) Assignee: THE WALMAN OPTICAL COMPANY, Minneapolis, MN (US)

( * ) Notice: Subject to any disclaimer, the term of this patent is extended or adjusted under 35 U.S.C. 154(b) by 367 days.

(21) Appl. No.: 14/624,036

(22) Filed: Feb. 17, 2015

(65) Prior Publication Data

US 2016/0237312 A1    Aug. 18, 2016

(51) Int. Cl.
| C09D 183/06 | (2006.01) |
| C08G 77/14 | (2006.01) |
| G02B 1/04 | (2006.01) |
| G02B 1/10 | (2015.01) |
| C08G 77/20 | (2006.01) |

(52) U.S. Cl.
CPC ........... C09D 183/06 (2013.01); *C08G 77/14* (2013.01); *C08G 77/20* (2013.01); *G02B 1/041* (2013.01); *G02B 1/10* (2013.01)

(58) Field of Classification Search
None
See application file for complete search history.

(56) References Cited

U.S. PATENT DOCUMENTS

| 3,715,293 A | 2/1973 | Sandner et al. |
| 3,801,329 A | 4/1974 | Sandner et al. |
| 4,000,115 A | 12/1976 | Jacobs |
| 4,058,401 A | 11/1977 | Crivello |
| 4,069,055 A | 1/1978 | Crivello |
| 4,101,513 A | 7/1978 | Fox et al. |
| 4,161,478 A | 7/1979 | Crivello |
| 4,378,250 A | 3/1983 | Treadway et al. |
| 5,343,260 A * | 8/1994 | Henry ............... G02B 1/041 264/1.7 |
| 5,652,321 A | 7/1997 | Kawauchi et al. |
| 5,789,082 A | 8/1998 | Treadway |
| 5,907,000 A | 5/1999 | Treadway |
| 6,100,313 A * | 8/2000 | Treadway ............. C09D 4/00 522/170 |

(Continued)

FOREIGN PATENT DOCUMENTS

| EP | 1235104 A1 | 8/2002 |
| EP | 1862514 A4 | 3/2008 |

(Continued)

OTHER PUBLICATIONS

SciFinder Acc# 2007_1443687 (2007).*

(Continued)

*Primary Examiner* — Kenneth J Stachel
(74) *Attorney, Agent, or Firm* — Fredrikson & Byron, P.A.

(57) ABSTRACT

A combination comprising a substrate and cured coating composition formed of the hydrolysis product of an epoxy functional alkoxy silane in combination with one or more monoaromatic (mono- or di) glycidyl ethers, the cured coating providing improved adhesion as compared to previous known UV curable coatings. The coating composition includes at least one monoaromatic di- or monoglycidyl ethers, and most preferably includes resorcinol diglycidyl ether.

7 Claims, 1 Drawing Sheet

| CMPD | NAME; IUPAC NAME | STRUCTURE | FORMULA |
|---|---|---|---|
| (A) | Resorcinol diglycidyl ether (RDGE); 2-[[3-(oxiran-2-ylmethoxy)phenoxy]methyl]oxirane | | $C_{12}H_{14}O_4$ |
| (B) | o-cresyl glycidyl ether; 2-[(2-methylphenoxy)methyl]oxirane | | $C_{10}H_{12}O_2$ |
| (C) | p-tert-butylphenyl glycidyl ether; 2-[(4-tert-butylphenoxy)methyl]oxirane | | $C_{13}H_{18}O_2$ |
| (D) | Phenyl glycidyl ether; 2-(phenoxymethyl)oxirane | | $C_9H_{10}O_2$ |
| (E) | p-nonylphenyl glycidyl ether; 2-[(4-nonylphenoxy)methyl]oxirane | | $C_{18}H_{28}O_2$ |
| (F) | Hydroquinone diglycidyl ether; Hydroquinone 1,4-diglycidyl ether; 2-[[4-(oxiran-2-ylmethoxy)phenoxy]methyl]oxirane, F0777-0005, Oxirane, 2,2'-[1,4-phenylenebis(oxymethylene)]bis- | | $C_{12}H_{14}O_4$ |

(56) References Cited

U.S. PATENT DOCUMENTS

| | | |
|---|---|---|
| 6,250,760 B1 | 6/2001 | Treadway |
| 6,335,832 B1 | 1/2002 | Oka et al. |
| 6,780,232 B2 | 8/2004 | Treadway |
| 7,037,585 B2 | 5/2006 | Treadway |
| 7,384,695 B2 | 6/2008 | Treadway |
| 7,514,482 B2 | 4/2009 | Treadway |
| 7,981,514 B2 | 7/2011 | Treadway |
| 2001/0036554 A1 | 11/2001 | Jin et al. |
| 2004/0234789 A1* | 11/2004 | Treadway ............ C08G 59/306 428/451 |
| 2007/0021523 A1* | 1/2007 | Treadway ............ C08G 59/306 522/71 |
| 2008/0311408 A1 | 12/2008 | Treadway |
| 2010/0035067 A1 | 2/2010 | Colton |
| 2010/0222525 A1 | 9/2010 | Ichiryu et al. |
| 2012/0015191 A1 | 1/2012 | Treadway |
| 2012/0115991 A1 | 5/2012 | Hugenberg et al. |
| 2014/0057115 A1 | 2/2014 | Treadway |
| 2014/0342091 A1* | 11/2014 | White ................. C08G 59/302 427/386 |

FOREIGN PATENT DOCUMENTS

| | | |
|---|---|---|
| WO | 2010001992 A1 | 1/2010 |
| WO | 2011134686 A1 | 11/2011 |

OTHER PUBLICATIONS

SciFinder Registry No. 2238-07-5 (2019).*
International Patent Application No. PCT/US2016/017484, International Search Report and Written Opinion dated May 23, 2016, 12 pages.
International Search Report and Written Opinion for International Application No. PCT/US2013/054873, dated Oct. 7, 2013; 12 pages.
Colts Laboratories, Description of Services, Posted Date: Sep. 11, 2014, Retrieved from https://d2oc0ihd6a5bt.cloudfront.net/wp-content/uploads/sites/398/2014/03/Description-of-Services-O-9-10-14.pdf, 13 pages.
Aron Oxetane Technical information, Toagosei America Inc., Retrieved on Jun. 10, 2013, http://instantadhesives.aronalpha.net/Asset/OXETANE%20TDS.pdf, 19 pages.

* cited by examiner

| CMPD | NAME; IUPAC NAME | STRUCTURE | FORMULA |
|---|---|---|---|
| (A) | Resorcinol diglycidyl ether (RDGE); 2-[[3-(oxiran-2-ylmethoxy)phenoxy]methyl]oxirane | | $C_{12}H_{14}O_4$ |
| (B) | o-cresyl glycidyl ether; 2-[(2-methylphenoxy)methyl]oxirane | | $C_{10}H_{12}O_2$ |
| (C) | p-tert-butylphenyl glycidyl ether; 2-[(4-tert-butylphenoxy)methyl]oxirane | | $C_{13}H_{18}O_2$ |
| (D) | Phenyl glycidyl ether; 2-(phenoxymethyl)oxirane | | $C_9H_{10}O_2$ |
| (E) | p-nonylphenyl glycidyl ether; 2-[(4-nonylphenoxy)methyl]oxirane | | $C_{18}H_{28}O_2$ |
| (F) | Hydroquinone diglycidyl ether; Hydroquinone 1,4-diglycidyl ether, 2-[[4-(oxiran-2-ylmethoxy)phenoxy]methyl]oxirane, F0777-0005, Oxirane, 2,2'-[1,4-phenylenebis(oxymethylene)]bis- | | $C_{12}H_{14}O_4$ |

GLYCIDYL ETHER BASED OPTICAL COATING COMPOSITIONS

A substantially solvent-free coating composition for forming a transparent, abrasion-resistant, optionally dye-accepting coating upon a substrate, the composition comprising a binder component and a curing agent component, the binder component comprising a partially hydrolyzed organo-functional alkoxysilane and a monoaromatic (mono- or di)glycidyl ether.

FIELD OF THE INVENTION

The present invention relates to the field of transparent coatings for polymeric objects such as eyeglass lenses.

BACKGROUND

There is an ongoing need and desire to provide coating compositions that are capable of providing lenses and other such surfaces with improved combinations of properties. For instance, Applicant's U.S. Pat. No. 6,100,313 provides, inter alia, a coating composition that accepts dye well, that provides exceptional abrasion-resistance (AR), and that is substantially free of volatiles. The composition includes a partially hydrolyzed epoxy-functional alkoxysilane, and can also include a polymerizable ether selected from the group consisting of glycidyl ethers, allyl ethers and vinyl ethers.

Glycidyl ethers said to be useful in the invention of the '313 patent include "triglycidyl ether, γ-glycidoxypropyl trimethoxy silane, triglycidyl ether, 1,4-butanediol diglycidyl ether, Bisphenol A diglycidyl ether, the C8-C14 alkyl glycidyl ethers, butyl glycidyl ether, cresyl glycidyl ether, phenyl glycidyl ether, nonylphenyl glycidyl ether, p-tert-butylphenyl glycidyl ether, 1,4-butanediol diglycidyl ether, neopentyl glycol diglycidyl ether, resorcinol diglycidyl ether, polyglycidyl ethers of aliphatic polyols, cyclohexane dimethanol diglycidyl ether, 2-ethylhexyl glycidyl ether, polyglycol diepoxide, polyglycidyl ether of castor oil, trimethylolethane triglycidyl ether, trimethylolpropane triglycidyl ether, dibromoneopentyl glycol diglycidyl ether, and 3,4-epoxycyclohexyl methyl-3,4-epoxycyclohexane carboxylate. Glycidyl ethers, if used alone as the polymerizable ether, are present preferably in a weight concentration (solids basis) of from about 10% to about 50%."

Also, Applicant's patent application U.S. Ser. No. 13/789,998 ("Oxetane") describes a combination comprising a coated and cured composition as a layer upon the surface of a polymeric material, that includes a partially hydrolyzed organo-functional alkoxysilane and a polymerizable aromatic oxetane, such as 1,4-Bis[(3-ethyl-3-oxetanylmethoxy)methyl]benzene, which is an aromatic, difunctional oxetane available commercially as "OXT-121").

The optical and other industries continue to seek materials, and corresponding surface treatments or coatings, that provide improved properties, such as adhesion, tintability, abrasion resistance, and solubility.

SUMMARY OF THE INVENTION

In one embodiment, the present invention provides a combination comprising a substrate and cured coating formed of the hydrolysis product of an epoxy functional alkoxy silane in combination with one or more monoaromatic (mono- or di)glycidyl ethers. A coating of this invention preferably exhibits an optimal combination of properties that meet or exceed those provided by conventional coatings, including to provide improved adhesion resistance, preferably without the need for a primer, and as determined by crosshatch adhesion tests according to ASTM 3359 (including those involving deionized water, humidity and/or QUV testing). The compositions can be adapted to be tintable as well, using conventional methods and as described herein.

In one embodiment, the invention provides a coating composition for forming an abrasion-resistant coating upon a substrate, the composition comprising an ether selected from the group consisting of:

a. resorcinol diglycidyl ether (also referred to as 1,3-benzenediol-2,2'-[oxybis(methylene)]dioxirane (1:1) ("RDGE"), b. cresyl glycidyl ether (also referred to as epoxidized ortho cresol, o-cresyl glycidyl ether; 2-[(2-methylphenoxy)methyl]oxirane, Tradename GE10), c. p-tert-butylphenyl glycidyl ether (also referred to as p-tert-butylphenyl-1-(2,3-epoxy)propyl ether; IUPAC Name: 2-[(4-tert-butylphenoxy)methyl]oxirane, Tradename GE11), d. phenyl glycidyl ether (also referred to as epoxidized phenol, 2-(phenoxymethyl)oxirane, an aromatic monofunctional compound (monoepoxide), Tradename GE13), e. nonylphenyl glycidyl ether (also referred to as 2-[(4-nonylphenoxy)methyl]oxirane), and f. hydroquinone diglycidyl ether (also referred to as 1,4-bis(glycidyloxy) benzene).

In a particularly preferred embodiment, the ether comprises RDGE (compound (A) above), either alone or in combination with one or more other ethers, including aliphatic or other monoaromatic ethers from within the list provided above. In addition to improved adhesion, RDGE tends to provide improved solubility for use in compositions of the present invention, particularly as compared to ethers (B) through (F) listed above.

Though each of monoaromatic ethers (A) through (E) (though not (F)) as described herein can be found within the listing of ethers described in the '313 patent, coatings of the present invention provide a surprising and optimal combination of properties that include usefulness with a variety of substrates. In turn, a composition of this invention can provide comparable or improved properties selected from the group consisting of adhesion resistance, stability, tintability, and abrasion resistance, among others. In a particularly preferred embodiment, a composition that includes RDGE can be used to provide a UV curable coating having the potential to meet each of three different adhesion tests used in the optical industry (deionized water, humidity, and QUV), which taken together are typically considered to provide the most stringent adhesion tests used in the industry. Prior UV cured coatings, at their closest, tend to meet only two or fewer of such tests, and particularly when used on High Index substrates, can tend to meet only one of such tests, at most.

To the best of applicant's awareness, compositions of the present invention provide the only known UV curable, and optionally tintable, coating capable of meeting each of these tests, and in particularly the stringent QUV test.

BRIEF DESCRIPTION OF THE DRAWING

In the Drawing, FIG. 1 provides a chart showing common names, IUPAC names, structures and formulas for each of the preferred glycidyl ethers of this invention.

DETAILED DESCRIPTION

A UV-cured composition of the present invention can be used as a base coat to provide abrasion resistance (e.g., as determined by Bayer abrasion) that approximates that of a comparable thermally cured base coating, when used as the base coat for an antireflective coating (stack) positioned thereon. The present composition, however, provides various advantages over such thermal cure coatings, including shorter processing times, while having the potential to provide tintability that is as good or better than conventional compositions.

In turn, the composition is particularly well suited for use as the base coat, before the application of one or more additional layers. Such additional layers often include, for instance, a quartz or oxide (e.g., silicon dioxide) layer, followed by a plurality of coated layers. The resulting "stack" of coated layers can be applied in order to provide an improved array of properties to the overall coated material, including in particular abrasion resistance, as compared to conventional compositions. Applicant has discovered the manner in which particular polymerizable monomers from the group described herein as monoaromatic (mono- or di)glycidyl ethers can be used in combination with organo-functional silanes in order to provide improved compositions, and corresponding base coats having excellent adhesion to polycarbonate and other substrates. More preferably, and desirably, the compositions of this invention have comparable or even improved tintability, as compared to conventional compositions.

The formation of an abrasion resistant coating, for use on eyeglass lenses, will typically begin with the application of a composition of this invention, e.g., by spin coating and curing the composition with ultraviolet energy. Thereafter, the coated base composition can be subjected to one or more intermediate treatments, for instance, it can be tinted using conventional means, e.g., by dipping the coated lens into a tint bath.

Once the base composition has been applied, cured, and tinted, the lens material can be subjected to a conventional coating machine, for the application of an antireflection coating, in the form of a 'stack' or plurality of layers. Once coated with the composition of this invention, in the form of an initial base coat, the coated lens is typically degassed (e.g., under suitable conditions of time, vacuum, and temperature), followed by the application of an intermediate layer (e.g., quartz or silicon dioxide), which itself can be compacted by e-beam or other means, and finally by the application of one or more AR coatings applied by means of vapor deposition.

The composition can be used to provide an improved combination of properties, particularly for use in coating lenses and other transparent polymeric materials. Such lens materials include those having an array of properties (e.g., refractive index), and preferably includes both polycarbonate and high index lenses. The coating composition is itself substantially solvent free, and in turn, provides minimal, if any, detectable volatiles in the course of its application, curing, or use. Detectable volatiles are likely to be found, if at all, upon the elimination of methanol upon curing of certain compositions.

Compositions of this invention are particularly well suited for polymeric substrates, and particularly high refractive index substrates intended for optical applications, including thermosetting and thermoplastic polycarbonates, as well as polyurethanes. Such substrates can be used for a variety of applications, including for automotive instrumentation, aviation gauges and instruments, display and/or shielding windows, eyewear lenses, handheld meters and devices, molded display windows and panels, outdoor equipment gauges and displays, test & laboratory instrument displays, screen printing POP signage, thermoformed displays, medical displays and panels, and video and LED filters.

In a further preferred embodiment, a coated substrate of this invention comprises a high index material. Particularly preferred high index materials of this type comprise a polyisocyanate compound and a polythiol compound, to provide are described in U.S. Pat. No. 5,652,321, the disclosure of which is incorporated herein by reference. Such materials are described as having an extremely high refractive index and excellent heat resistance, as exemplified in commercial products such as the MR8 and MR10 lines of lenses available from Mitsui Toatsu Chemicals, Inc.

Given the present description, those skilled in the art will appreciate the manner in which a monoaromatic glycidyl ether can be selected and used to provide desired performance, for instance, based upon the overall formulation, the substrate being coated, additional AR or other coatings to be used, and conditions of use.

When used in a composition adapted to provide a substantially non-tintable coating, the monoaromatic (mono- or diglycidyl) ether can be present in the coating compositions of the invention at a weight concentration (solids basis) of between about 1 and about 10 weight percent, more preferably between about 2 and about 8 weight percent, and most preferably between about 4 and about 6 weight percent. When used in a composition adapted to provide a substantially tintable coating (e.g., for use in crafting sunglasses), the monoaromatic ether can be present in the coating compositions of the invention at a weight concentration (solids basis) between about 1 and about 40 weight percent, more preferably between about 10 and about 30 weight percent, and most preferably between about 15 and about 25 weight percent. Increasing amounts within these ranges tend to correspond with improved properties, such as improved adhesion. Those skilled in the art, given the present description, will understand the manner in which a 'tintable' coating of this type is typically one that can be coated using standard conditions (e.g., dipping in BPI Black for 15 minutes at 95-100 C) so as to provide between 18-22% transmission, as compared to a substantially non-tintable coating, which under comparable conditions would result in between 40-45% transmission. The word "substantially", as used with respect to the present invention, will typically refer to an amount or level sufficient for its intended use.

In a preferred embodiment, a composition of the present invention comprises a partially hydrolyzed organo-functional alkoxysilane in combination with a monoaromatic glycidyl ether, and optionally other ingredients. The organofunctional alkoxysilane can be of any suitable type, and is preferably selected from the group consisting of epoxy-, vinyl- and acryloxy-functional alkoxysilanes. The organofunctional alkoxysilane, when present, can be used in any suitable amount, e.g., between about 10 and about 60 weight percent, and more preferably between about 20 and about 50 weight percent.

Suitable acryloxy-functional organosilanes include, are selected from the group consisting of: 3((meth)acryloxypropyl)trimethoxy silane, 3((meth)acryloxyproply)methyl dimethoxy silane, and 3((meth)acryloxypropyl)dimethyl methoxy silane, including combinations thereof.

Suitable vinyl-functional organosilanes include, but are selected from the group consisting of: vinyldimethyl ethoxysilane, vinylmethyl dimethoxysilane, vinylphenyl diethoxysilane, vinyltrimethoxysilane, and vinyltriethoxysilane, including combinations thereof.

Suitable epoxy functional alkoxy silane precursors, for use in preparing the at least partially hydrolyzed polymerizable ingredient, are selected from the group consisting of epoxyalkylalkoxysilanes of the following structure: Q-$R_1$—Si$(R_2)_m$—$(OR_3)_{3-m}$, The epoxy functional alkoxy silane precursor of the at least partially hydrolyzed polymerizable ingredient is preferably an epoxyalkylalkoxysilane of the following structure: Q-$R_1$—Si$(R_2)_m$—$(OR_3)_{3-m}$, wherein $R_1$ is a $C_1$-$C_{14}$ alkylene group, $R_2$ and $R_3$ independently are $C_1$-$C_4$ alkyl groups and Q is a glycidoxy or epoxycyclohexyl group, and m is 0 or 1. The alkoxy groups are at least partially hydrolyzed to form silanol groups with the release of the $R_3$OH alcohol, and some condensation of the silanol groups occurs. Epoxy reactivity is preserved, however. Many epoxy-functional alkoxysilanes are suitable as hydrolysis precursors, including glycidoxymethyl-trimethoxysilane, glycidoxymethyltriethoxysilane, glycidoxymethyl-tripropoxysilane, glycidoxymethyl-tributoxysilane, b-glycidoxyethyltrimethoxysilane, b-glycidoxyethyltriethoxysilane, b-glycidoxyethyl-tripropoxysilane, b-glycidoxyethyl-tributoxysilane, b-glycidoxyethyltrimethoxysilane, a-glycidoxyethyl-triethoxysilane, a-glycidoxyethyl-tripropoxysilane, a-glycidoxyethyltributoxysilane, g-glycidoxypropyl-trimethoxysilane, g-glycidoxypropyl-triethoxysilane, g-glycidoxypropyl-tripropoxysilane, g-glycidoxypropyltributoxysilane, b-glycidoxypropyl-trimethoxysilane, b-glycidoxypropyl-triethoxysilane, b-glycidoxypropyl-tripropoxysilane, b-glycidoxypropyltributoxysilane, a-glycidoxypropyl-trimethoxysilane, a-glycidoxypropyl-triethoxysilane, a-glycidoxypropyl-tripropoxysilane, a-glycidoxypropyltributoxysilane, g-glycidoxybutyl-trimethoxysilane, d-glycidoxybutyl-triethoxysilane, d-glycidoxybutyl-tripropoxysilane, d-glycidoxybutyl-tributoxysilane, d-glycidoxybutyl-trimethoxysilane, g-glycidoxybutyl-triethoxysilane, g-glycidoxybutyl-tripropoxysilane, g-propoxybutyl-tributoxysilane, d-glycidoxybutyl-trimethoxysilane, d-glycidoxybutyl-triethoxysilane, d-glycidoxybutyl-tripropoxysilane, a-glycidoxybutyl-trimethoxysilane, a-glycidoxybutyl-triethoxysilane, a-glycidoxybutyl-tripropoxysilane, a-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-triethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane.

A particularly preferred organo-functional alkoxysilane is γ-glicidoxypropyl trimethoxy silane due to its wide commercial availability.

Hydrolysis of the alkoxy-functional alkoxysilane precursor may occur in an acidic environment, and reference is made to U.S. Pat. No. 4,378,250, the teachings of which are incorporated herein by reference. Hydrolysis of the alkoxy groups liberates the associated alcohol to form silanol groups; these, in turn, are relatively unstable and tend to condense spontaneously. Preferably, the alkoxysilane is reacted with a stoichiometricly sufficient quantity of water to hydrolyze at least 50% of the alkoxy groups and most preferably from about 60% to about 70% of the alkoxy groups. For the hydrolysis of an epoxy-functional trialkoxy silane, good results have been obtained by reacting the silane with a stoichiometricly sufficient quantity of water to hydrolyze two-thirds of the alkoxy groups.

The composition of this invention further comprises a monomeric organofunctional silane, and more preferably a monomeric (silanol free) alkoxy functional silane, which can also be referred to as an unhydrolyzed alkoxy functional alkoxy silane. In turn, certain preferred compositions can include both hydrolyzed and unhydrolyzed alkoxy functional alkoxy silanes, with the latter being present in an amount sufficient to reduce the viscosity of the composition itself. It is noted that, while the "hydrolysis product" of such a silane can certainly include compounds that are themselves partially hydrolyzed (depending on the mole ratio of water to alkoxy groups as described herein), whereas an unhydrolyzed silane of the sort claimed is clearly one that is prepared and used in the substantial absence of water. As described herein, water is removed from the hydrolysis product component, prior to the addition of an unhydrolyzed component, in order to permit the latter to retain its unhydrolyzed nature. Hence, when and to the extent "partially hydrolyzed" silanes might be discussed in the art, these compounds tend to be different than, and not at all suggestive of the use of both hydrolyzed and unhydrolyzed silane components as presently described.

In turn, the composition desirably includes an effective amount up of a suitable non-hydrolyzed alkoxy functional silane, including those selected from the silanes listed above. When used in combination with an organofunctional polysiloxane, the non-hydrolyzed epoxy functional alkoxy silane desirably is present in an amount not less than about 5%, preferably at least about 20%, and most preferably from about 40% to about 50% by weight, solids basis. Preferably, the epoxy functional alkoxy silane that is included as the non-hydrolyzed component also is of the same or similar type as that employed to make the hydrolyzed component. It should be understood that the hydrolyzed and non-hydrolyzed components may be different and each may utilize one or a blend of different epoxy functional alkoxy silanes, as desired.

The monomeric silane is optional, and therefore used in an amount of between about 0% and about 50%, and more preferably between about 10% and about 40%, and even more preferably between about 20% and about 40% by weight of the composition, with typically more monomeric silane (e.g., about 35 to about 45%) being used in substantially non-tintable compositions, as compared to substantially tintable compositions (e.g., having about 35% to about 45% by weight).

A composition of the present invention can further comprise one or more additional reactive ingredients, selected from the group consisting of one or more non-hydrolyzed silanes, one or more polymerizable ethers, and one or more ethylenically unsaturated monomer components, desirably an acrylic monomer component that preferably includes a monomer having an acrylic functionality of not more than two. The use of an acrylic monomer, though optional, is particularly preferred for use in compositions intended to coat conventional, e.g., polycarbonate, substrates, as compared to high index materials.

A wide variety of ethylenically unsaturated monomers (including oligomers) can be employed in the coating composition of the invention, and acrylic monomers and oligomers, particularly those having acrylic functionalities of not greater than two, are preferred. Useful acrylic compounds for improving adhesion to polycarbonate substrates include both mono and di-functional monomers, but other or additional polyfunctional acrylic monomers may also be included.

Examples of monofunctional acrylic monomers include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers, including both difunctional and tri and tetrafunctional monomers, include neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, 1,5-pentanediol dimethacrylate, and the like. The acrylic-functional monomers and oligomers desirably are employed at a weight concentration of at least about 10% by weight, preferably from about 10% to about 50%, and most preferably from about 10% to about 25%, all on a solids basis.

The composition preferably also contains one or more cationic initiators, sufficient to polymerize the epoxy-functional components, and one or more free radical initiators sufficient to initiate polymerization of the ethylenically unsaturated coating components (e.g., acrylic-functional components).

Useful cationic initiators for the purposes of this invention can include thermal or photoinitiators (e.g., UV initiators) and include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts, e.g., diphenyliodonium chloride. The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978; U.S. Pat. No. 4,101,513, "Catalyst For Condensation Of Hydrolyzable Silanes And Storage Stable Compositions Thereof," by F. J. Fox et al. issued Jul. 18, 1978; and U.S. Pat. No. 4,161,478, "Photoinitiators," by J. V. Crivello issued Jul. 17, 1979, the disclosures of which are incorporated herein by reference. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference. Preferred cationic initiators for use in the compositions of this invention are the salts of Group VIa elements and especially the sulfonium salts. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

Although photoactivated free-radical initiator are preferred, thermally activated free radical and cationic initiators may also be used. Useful photoinitiators for this purpose are the haloalkylated aromatic ketones, chloromethylbenzophenones, certain benzoin ethers, certain acetophenone derivatives such as diethoxyacetophenone and 2-hydroxy-2-methyl-1-phenylpropan-1-one. A preferred class of free-radical photoinitiators is the benzil ketals, which produce rapid cures. A preferred photoinitiator is α,α-dimethoxy-α-phenyl acetophenone (Iragacure™ 651, Ciba-Geigy, disclosed in U.S. Pat. Nos. 3,715,293 and 3,801,329). The most preferred photoinitiator, in accordance with this invention, is 2-hydroxy-2-methyl-1-phenylpropane-1-one (Darocure™ 1173, Ciba-Geigy Corporation). Specific examples of photoinitiators include ethyl benzoin ether, isopropyl benzoin ether, dimethoxyphenyl acetophenone, diethoxy acetophenone, and benzophenone.

A preferred class of free-radical photoinitiators is the benzil ketals, which produce rapid cures. Suitable photoinitiators include .alpha.,.alpha.-dimethoxy-.alpha.-phenyl acetophenone (Iragacure™ 651), and 2-hydroxy-2-methyl-1-phenylpropane-1-one (Darocure™ 1173, Ciba-Geigy Corporation). A preferred photoinitiator is 1-hydroxycyclohexyl phenyl ketone (available as Irgacure 184). Specific examples of photoinitiators include ethyl benzoin ether, isopropyl benzoin ether, dimethoxyphenyl acetophenone, diethoxy acetophenone, and benzophenone. Other examples of suitable initiators are diethoxy acetophenone ("DEAP", First Chemical Corporation) and 1-benzoyl-1-hydroxycyclohexane ("Irgacure 184", Ciba Geigy).

Compositions of the present invention can be used to coat a variety of materials, generally polymeric materials, and most preferably those used for the manufacture of optical lenses. Those skilled in the corresponding art will appreciate the manner in which the lens material chosen for a particular use or prescription can be differentiated by various factors, including its weight, thickness, transmission of radiant energy and optical performance.

A composition of this invention can include other ingredients as well, e.g., other materials that are reactive with the epoxy groups such as hydroxyl bearing compounds such as trimethylol propane or cyclohexane dimethanol may be used to modify the composition. In addition, the composition can include one or more flow control agents such as BYK 307, rheology modifiers such as cellulose acetate butyrate, metal oxides such as colloidal titanium dioxide, colloidal silica, etc.

The following table shows the index of refraction of some available lens materials.

| Lens Material | Index of Refraction |
| --- | --- |
| allyl diglycol carbonate (e.g., "CR-39") | 1.498 |
| Crown Glass | 1.523 |
| Polycarbonate | 1.586 |
| MR8 | 1.6 |
| MR10 | 1.67 |

With certain preferred embodiments as described herein, a composition of the present invention can be detected by virtue of the significant concentration of aromatic groups associated with the glycidyl ethers described herein, as compared to what will typically be a considerably smaller concentration of aromatic groups, if any, that may be associated with one or more initiators described herein.

EXAMPLES

The invention may be better understood by reference to the following non-limiting examples. Unless otherwise indicated, the concentration of ingredients in a composition is described as a percentage (solids basis) based on the weight of the overall composition. Cured coatings were subjected to several tests, outlined as follows:

Materials and Methods

Glycidyl ethers suitable for use in a composition of this invention are described herein, the structures and suitable sources for which are shown in FIG. 1.

Additional ingredients:
A187 Glycidoxy propyl trimethoxy silane (GE Silicones)
A186 Epoxy Cyclohexyl Trimethoxy Silane (GE Silicones)
A 1630 Methyl trimethoxy silane (Crompton Corp)
SR 9209 alkoxylated aliphatic diacrylate (Sartomer, Inc.)
SR 444 pentaerythritol triacrylate (Sartomer, Inc.)
SR-351 trimethylolpropane triacrylate (TMPTA, Sartomer, Inc.)
SR-238 1,6 hexanediol diacrylate (HDODA, Sartomer, Inc.)
DEAP 2,2-diethoxy acetophenone, free radical initiator (First Chemical Corporation)
CPI 6976 Cationic initiator (Aceto Corp.)
CPI 6972 Cationic initiator (Aceto Corp.)
Irgacure 184 Free radical photoinitiator (Ciba Geigy)
Irgacure 250 Cationic photoinitiator (Ciba Geigy)
Uvacure 1502 Cycloaliphatic epoxy resin (UCB Chemicals Corp)
OXT-121 (1,4-Bis[(3-ethyl-3-oxetanylmethoxy)methyl] benzene, CAS No. 142627-97-2 (Toagosei Co.)
BYK 307 Silicone type flow control agent (BYK-Chemie)
HELOXY™ 107 diglycidyl ether of cyclohexane dimethanol (Momentive, Inc.)
HELOXY™ 48 low viscosity aliphatic triglycidyl ether (Momentive, Inc.)

Examples

Preparation—a stripped, hydrolyzed epoxy silane resin (resin A) was prepared as the reaction product of nonhydrolyzed silane (A187), together with H2O, and (10%) HCl, in the manner described in U.S. Pat. No. 6,100,313 and U.S. Ser. No. 12/987,650, the disclosures of which are incorporated herein by reference. Various compositions were prepared as described herein, based upon the master batch, and were coated on a variety of conventional lens materials that included a polycarbonate, a 1.6 high index material, and a 1.67 high index material. All amounts are in weight percent, unless otherwise indicated. Initial results are provided below.

The various compositions were coated on conventional polycarbonate and high index lenses, cured and evaluated for both adhesion and other properties.

Experiments were also performed to determine the effect of various compositions in coating high index lenses, and in particular, those lenses prepared from polymers sold under the brandnames MR8 and MR10. All samples were coated on 1.6 RI lenses made from monomer blend MR8 at 4-5 microns thickness and UV cured using high pressure mercury lamp. The same results were obtained when coated on 1.67 RI lenses made from MR10 monomer blend. The samples were evaluated for adhesion as per ASTM D 3359 as described herein.

Experiments were performed in order to compare a silane composition containing RDGE, a preferred ether of the present invention, in combination with various other compositions, including:

i) a composition that instead contained a trifunctional aliphatic ether (in particular, trimethylolpropane triglycidyl ether, of the type described in Applicant's prior U.S. Pat. No. 6,100,313), and ii) a composition that instead contained 1,4-Bis[(3-ethyl-3-oxetanylmethoxy)methyl]benzene, which is an aromatic, difunctional oxetane available commercially as "OXT-121"), and iii) a composition that included RDGE, in combination with one or more conventional aliphatic glycidyl ethers.

For purposes of the present specification, adhesion is preferably determined by means of ASTM 3359, using test methods conventional in the optical (e.g., eyeglass) lens coating industry, though with the notable exception that the lenses are provided in ground, polished form (as routinely done in commercial applications), as compared to first being chemically etched. Briefly, this industry standard test involves scoring the cured coating with a blade assembly in a cross-hatched fashion to leave diamond-shaped patches. This is followed by an attempt to lift the diamond-shaped patches from the substrate through the use of a pressure sensitive adhesive tape that is applied to the cross hatched surface and then pulled away. The degree to which the cross-hatched portions of the coating remain adhered to the substrate provides a measure of adhesion to that substrate, and is reported as the percentage of diamond-shapes that remain adhered to the substrate. Crosshatch adhesion tests were run under three conditions, in the manner described in Colts Laboratories catalog of standard services available at www.colts-laboratories.com, which include:

(1) boiling water (deionized water). This involves a standard crosshatch adhesion test in which a series of fine cuts are first made across and into the surface of the coated test lens, which is then subjected to boiling water for a period of time, before tape is placed firmly on the crosshatched area and quickly pulled off.

(2) Cycle humidity oven (CHOCA). This involves a 3 day adhesion test in which coated lenses are submitted to both a crosshatch test and a cycle humidity test. The crosshatch cuts are completed prior to the start of the humidity portion, thereby attempting to replicate what might occur under actual conditions. In this test the oven cycles to 95% RH three times at 65 C, and the test lenses are inspected following each 8 hour cycle.

(3) Cycle humidity QUV/crosshatch, which mimics the most aggressive components of accelerated weathering. This involves a 3 day adhesion test in which coated lenses are submitted to both a crosshatch test and the cycle humidity test. The crosshatch cuts are completed prior to the start of the humidity portion, thereby attempting to replicate what may occur under actual conditions. The QUV equipment alternates between UVA and condensation cycles.

Results were scored according to standard acceptable procedures (as provided, for instance, by Colts Laboratories). Standard protocols and operating procedures were followed to determine crosshatch adhesion results under the following three categories:

5B—the edges of the cuts are completely smooth, none of the squares of the crosshatched area are detached.

4B—small flakes of the coating are detached at the intersections of the squares, less than 5% of the total area is affected.

3B—small flakes of the coating are detached along the edges and at intersections of cuts. The area affected is 5-15% of the total area.

2B—the coating has flaked along the edges and on parts of the squares. The area affected is 15-35% of the total area.

1B—the coating has flaked along edges of the cuts in large ribbons and whole squares are detached. The area affected is 35-655 of the total area.

0B—flaking and detachment worse than Classification 1 (greater than 65%).

Tintability—A coated and cured sample is immersed in BPI Black Dye (Brain Power Inc.) at 98-102° C. for 15 minutes and then rinsed with water and dried. Transmissivity is measured spectrophotometrically, and tintability is reported as percentage transmissivity.

Bayer abrasion (scratch resistance) testing—is performed by suitable modification of the oscillating sand method (ASTM-F735-94 Standard Test Method for Abrasion Resistance of Transparent Plastics and coatings), modified slightly to allow for use in the optical field. The test consists of a small pan that is shaken back and forth a distance of 4 inches, at 150 cycles for 4 minutes, using abrasion media the material known as Aluminum Oxide from Black Lab corp. Designation AO-14 Brown. Holes have been placed through the center section of the pan to allow the lenses to protrude up through the center of each hole, allowing the abrasion to take place without the loss of media.

Experiments

A composition (a) having an ether of this invention (RDGE-H) was compared with one (b) having an ether exemplified in the "oxetane" application described above. Surprisingly, as shown in Table 1, it was found that the composition containing RDGE passed each of the cross-hatch adhesion tests (deionized water, humidity, QUV), as compared to the oxetane composition, which passed only the deionized water test, but failed the humidity and QUV tests. Unless otherwise indicated, all ingredients are indicated as weight percentages, based on the weight of the compositions themselves.

TABLE 1

|  | (a) RDGE | (b) Oxetane (OXT121) |
|---|---|---|
| A18790 (Resin A, hydrolyzed epoxy silane) | 42.5 | 47.5 |
| A187 (glycidoxypropyl trimethoxy silane) | 37.4 | 31.7 |
| BDDA (butane diol diacrylate) | 10.7 | 7.9 |
| Glycidyl ether RDGE | 5.3 | 0 |
| Oxetane OXT 121 | 0 | 7.9 |
| IRG184 (free radical initiator) | 0.29 | 0.4 |
| CPI 6976 (cationic initator) | 4.37 | 4.35 |
| BYK307 (flow control agent) | 0.25 | 0.25 |
| TOTAL | 100 | 100 |
| PROPERTIES/TEST RESULTS |  |  |
| Tint BPI black (% transmission) | — | — |
| Bayer abrasion | 2.2 | 2.3 |
| Boiling DI water - PC | 5B | 5B |
| Boiling DI MR8 (1.60) | 5B | 5B |
| Boiling DI MR10 (1.67) | 5B | 5B |
| Humidity PC | 5B | 5B |
| Humidity 1.60 MR8 (1.60) | 5B | 5B |
| Humidity 1.67 MR10 (1.67) | 5B | 5B |

TABLE 1-continued

|  | (a) RDGE | (b) Oxetane (OXT121) |
|---|---|---|
| QUV PC | 5B | 5B (for the first of 3 cycles) (0B second cycle) |
| QUV MR8 (1.60) | 5B | 0B |
| QUV MR10 (1.67) | 5B | 0B |

Experiments were also performed to compare compositions having an ether of this invention (composition (a)—RDGE) with one exemplified in Applicant's above-captioned '313 patent and currently used in corresponding commercial products such as UV-87 available from Walman Ultra-Optics (composition (b) having Heloxy 5048), as well as the combination of both ethers (composition (c)). Tintability was adjusted in the manner commonly accepted in the optical industry, in order to render the transmission of each comparable, and less than 23. In Table 2, it can be seen that both compositions with RDGE performed surprisingly better than the composition b, having conventional ether. Specific amounts of ingredients were determined in order to approximate the same tintability and adhesion in each.

TABLE 2

|  | (a) RDGE | (b) Heloxy 5048 | (c) Both RDGE and Heloxy 5048 |
|---|---|---|---|
| A18790 (Resin A, hydrolyzed epoxy silane) | 30.0 | 31.6 | 30.15 |
| A187 (glycidoxypropyl trimethoxy silane) | 30.35 | 20.0 | 16.0 |
| BDDA (butane diol diacrylate) Glycidyl ether | 20.0 | 18.75 | 25.1 |
| RDGE | 15.0 | 0 | 10.05 |
| Heloxy 5048 polymerizable ether trimethylolypropane | 0 | 25.0 | 15.08 |
| IRG184 (free radical initiator) | 0.6 | 0.56 | 0.75 |
| CPI 6976 (cationic initator) | 3.8 | 3.85 | 3.52 |
| BYK307 (flow control) | 0.25 | 0.25 | 0.25 |
| TOTAL | 100 | 100 | 100 |
| PROPERTIES/TEST RESULTS |  |  |  |
| Tint BPI black (% transmission) | 20.0 | 22.2 | 22.0 |
| Boiling DI water/PC | 5B | 5B | 5B |
| Boiling DI water MR8 (1.60) | 5B | 0B | 5B |
| Boiling DI water MR10 (1.67) | 5B | 0B | 5B |
| Humidity PC | 5B | 0B | 5B |
| Humidity MR8 (1.60) | 5B | 0B | 5B |
| Humidity MR10 (1.67) | 5B | 0B | 5B |
| QUV PC | 5B | 0B | 5B |
| QUV MR8 (1.60) | 5B | 0B | 5B |
| QUV MR10 (1.67) | 5B | 0B | 5B |

TABLE 3

| Adhesion test 1 | Adhesion test 1 (deionized water) | Adhesion test 2 (humidity) | Adhesion test 3 (QUV) |
|---|---|---|---|
| RDGE on PC | Pass | Pass | Pass |
| Heloxy 5048 on PC | Pass | Fail | Fail |
| Oxetane on PC | Pass | Pass | Fail |
| RDGE on MR8 (1.60) | Pass | Pass | Pass |
| Heloxy 5048 on MR8 (1.60) | Fail | Fail | Fail |
| Oxetane on MR8(1.60) | Pass | Pass | Fail |
| RDGE on MR10 (1.67) | Pass | Pass | Pass |

TABLE 3-continued

| Adhesion test 1 | Adhesion test 1 (deionized water) | Adhesion test 2 (humidity) | Adhesion test 3 (QUV) |
|---|---|---|---|
| Heloxy 5048 on MR10 (1.67) | Fail | Fail | Fail |
| Oxetane on MR10 (1.67) | Pass | Pass | Fail |

Results are summarized in Table 3 above. It can be seen, that under the conditions of the current experiments, the composition based upon the use of RDGE surprisingly passed each of adhesion tests 1-3, as compared to compositions previously known and described, which failed one or more tests, most notably the QUV adhesion test.

The invention claimed is:

1. A combination comprising a substrate having a cured coating formed by the application of ultraviolet radiation to a solvent-free coating composition that comprises:
    a) a partially hydrolyzed alkoxy-functional silane, selected from the group consisting of an epoxy- functional alkoxysilanes, a vinyl- functional alkoxysilanes, and an acryloxy-functional alkoxysilane,
    b) a non-hydrolyzed alkoxy-functional silane,
    c) an ethylenically unsaturated monomer,
    d) a cationic photoinitiator,
    e) a free radical initiator, and
    f) 1,3-benzenediol-2,2'-[oxybis(methylene)]dioxirane, RDGE, wherein the cured coating exhibits a level 5B adhesion resistance for both a Colts Laboratories' Crosshatch Adhesion and Boiling Water test and a Colts Laboratories' Cycle Humidity Oven and Crosshatch test, and further comprising a quartz or silicon dioxide layer deposited over the cured coating.

2. The combination according to claim 1, wherein the cured coating also exhibits a level 5B adhesion resistance for a Colts Laboratories' Cycle Humidity QUV and Crosshatch test.

3. The combination according to claim 1, further comprising at least one antireflection coating formed over the quartz or silicon dioxide layer.

4. The combination according to claim 1, wherein the substrate is selected from the group consisting of polycarbonate, polyurethane, polyisocyanate, polythiol, and combinations thereof.

5. The combination according to claim 4, wherein the substrate comprises polyisocyanate and polythiol.

6. The combination according to claim 1, wherein 1,3-benzenediol -2,2'-[oxybis(methylene)]dioxirane, RDGE, is present in the solvent-free coating composition at a weight concentration between about 2 weight percent and about 8 weight percent of the solvent-free coating composition.

7. The combination according to claim 6, wherein 1,3-benzenediol -2,2'-[oxybis(methylene)]dioxirane, RDGE, is present in the solvent-free coating composition at a weight concentration between about 4 weight percent and about 6 weight percent of the solvent-free coating composition.

* * * * *